April 15, 1924.

H. A. SCHACKEL

CULTIVATOR ATTACHMENT

Filed April 3, 1922

1,490,638

INVENTOR.
Herman A. Schackel
BY A. M. Carlsen
ATTORNEY.

Patented Apr. 15, 1924.

1,490,638

UNITED STATES PATENT OFFICE.

HERMAN A. SCHACKEL, OF CARLOS, MINNESOTA.

CULTIVATOR ATTACHMENT.

Application filed April 3, 1922. Serial No. 549,249.

*To all whom it may concern:*

Be it known that I, HERMAN A. SCHACKEL, a citizen of the United States, residing at Carlos, in the county of Douglas and State of Minnesota, have invented a new and useful Cultivator Attachment, of which the following is a specification.

My invention relates to farm implements in general, and more particularly to attachments for cultivators. The object is to provide a light, efficient and reliable device for protecting potato vines, corn stalks or other kinds of growing crops from injury when the cultivator is in action.

In the accompanying drawing,—

Figure 1:
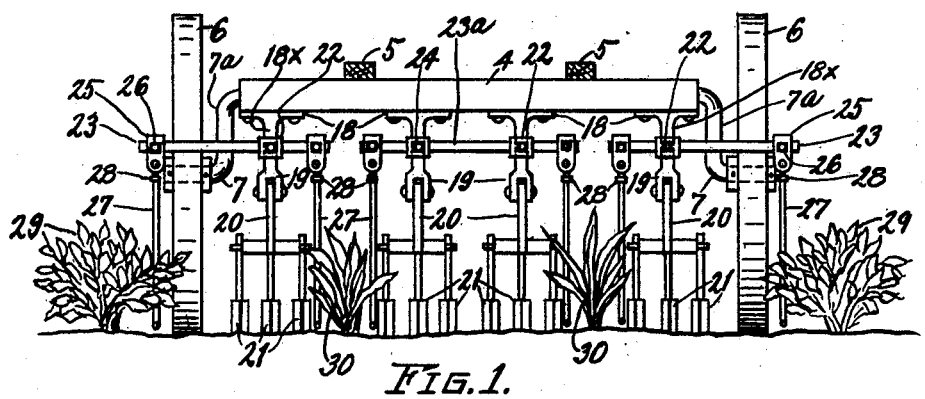
Fig. 1 is a front elevation of a cultivator of the so-called two row type, in operative position, with my device applied to it and some minor parts omitted.

Referring to the drawing by reference numerals, 4 is the main frame of a cultivator, 5 the draft poles secured to the front end of the frame and projecting forward in proper spaced relation, 6 are the ground wheels, 7 the main axle supported by said ground wheels and offset upwardly as at 7ª between the wheels and the main frame and extending horizontally across the rear end of the main frame and supporting it. 8 is the driver's seat suitably mounted as at 9 on the rear end of the frame.

Various makes of cultivators differ in their frame construction but for descriptive purposes I have illustrated a rectangular frame the front end of which has a number of downwardly extending spaced brackets 18, the lower ends of which are each forked as at 19 to straddle and pivotally engage the front end of a shovel beam 20. Each of said beams 20 extends rearwardly and carries a number of cultivator shovels 21.

Figure 2:
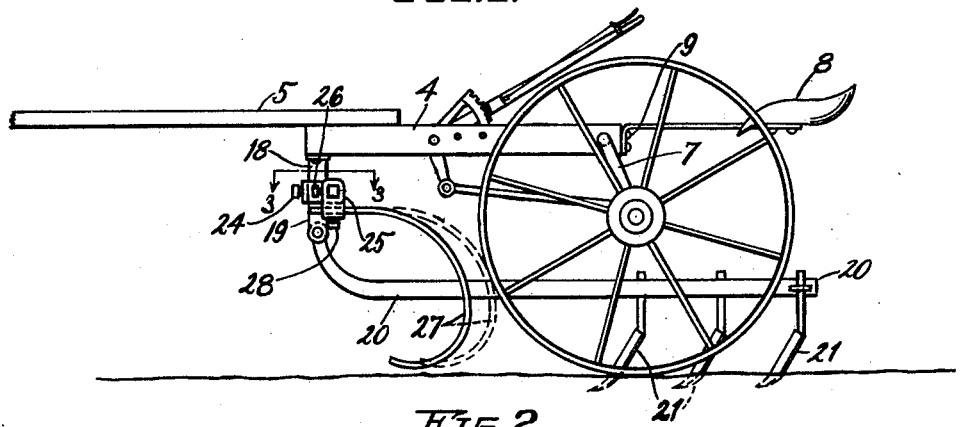
Fig. 2 is a side elevation of Fig. 1 looking as from the right toward the left in said Fig. 1.
Figure 3:
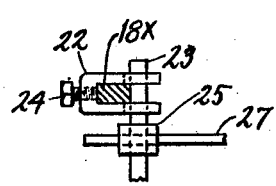
Fig. 3 is an enlarged detail view as on line 3—3 in Fig. 2.

For the vertical shank portion 18ˣ of each bracket 18 I provide a clamp 22 straddling said shank and having its forked ends perforated to receive a horizontal, transversely arranged bar 23 (see Figs. 1 and 3); said bar and shank are firmly clamped together by means of a set screw 24 engaging the forward side of the shank 18ˣ. Said bars 23 as also the middle bars 23ª may be square in cross section. Said middle bars 23ª in Fig. 1 may in some cases be omitted. Each of said bars has a number of brackets 25 slidably mounted on it and held in any desired position by a set screw 26. The lower portion of each bracket is bored longitudinally with relation to the frame and in said bore I secure by a screw 28 the front shank of a rearwardly and downwardly bent guard 27, preferably made of round bar stock and bent, about as shown in Fig. 2, slightly upward at its lower end. The set screw 28 in each bracket provides for holding each guard in any desired forward or rearward position. The guards 27 are suitably mounted in spaced relation (see Fig. 1) ahead of the ground wheels and in such numbers as deemed necessary, the main object being to brush or raise plants, such as potato vines 29 or corn stalks 30, from the path of the ground wheels. Some of the guards may also operate in front of the cultivator shovels, so as to also there prevent unnecessary crushing of the plants.

Manipulation of the handle 10 raises or lowers the frame and thereby regulates the depth it is desired to have the shovels 21 in the ground, and the guards 27 are secured, by screws 24, at such height that they just clear the ground (see Fig. 2) when the shovels are the desired depth for cultivating a field.

When the frame 4 is raised the front ends of the shovel beams are raised, and the shovels may at that time be raised out of the ground by other means (not shown) provided on all cultivators. This raising of the frame raises the guards 27 sufficiently above the ground to prevent their engaging any obstacles when the machine is driven idle.

Having thus described my invention, what I claim is:

The combination with a cultivator having a frame and supporting wheels, of means secured on the frame forward of the ground wheels for turning vines away from the path of the wheels and similar means turning away the vines from between the rows of plants on which the cultivator shovels or teeth are operating, said vine turning means comprising transversely arranged horizontal bars adjustable vertically on a fixed portion of the cultivator frame, movable members on said bars adapted to be adjusted to any part thereof, vertically disposed hook-shaped members each with one end slidably secured in one of said movable members and the other
5 end normally projecting forward near the ground and curved with its point upwardly therefrom.

In testimony whereof I affix my signature.

HERMAN A. SCHACKEL.

Witnesses:
FRANK F. EHLERT,
C. E. PEACOCK.